United States Patent
Nayar et al.

(10) Patent No.: US 12,256,035 B2
(45) Date of Patent: *Mar. 18, 2025

(54) SHORTCUT KEYPAD FOR VISUAL ELECTRONIC COMMUNICATIONS

(71) Applicant: Snap Inc., Santa Monica, CA (US)

(72) Inventors: Shree K. Nayar, New York, NY (US); Brian Anthony Smith, Brentwood, NY (US); Karl Bayer, New York, NY (US); Marian Pho, North Plainfield, NJ (US); Gurunandan Krishnan Gorumkonda, Kirkland, WA (US)

(73) Assignee: Snap Inc., Santa Monica, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 17/967,176

(22) Filed: Oct. 17, 2022

(65) Prior Publication Data
US 2023/0043479 A1    Feb. 9, 2023

Related U.S. Application Data

(63) Continuation of application No. 17/137,953, filed on Dec. 30, 2020, now Pat. No. 11,477,318.

(Continued)

(51) Int. Cl.
*H04M 1/72436*    (2021.01)
*G06F 3/04817*    (2022.01)
(Continued)

(52) U.S. Cl.
CPC .... *H04M 1/72436* (2021.01); *G06F 3/04817* (2013.01); *H04M 1/72457* (2021.01); *H04M 1/72469* (2021.01); *H04W 4/12* (2013.01)

(58) Field of Classification Search
CPC ......... H04M 1/72436; H04M 1/72457; H04M 1/72469; G06F 3/04817; G06F 3/016; G06F 3/0219; G06F 3/04886; H04W 4/12
See application file for complete search history.

(56) References Cited

U.S. PATENT DOCUMENTS 7,669,135 B2    2/2010   Cunningham et al.
2008/0235285 A1*  9/2008  Della Pasqua ....... G06Q 10/107
(Continued)

OTHER PUBLICATIONS

"U.S. Appl. No. 17/137,953, Non Final Office Action mailed Feb. 1, 2022", 18 pgs.

(Continued)

*Primary Examiner* — Farid Seyedvosoghi
(74) *Attorney, Agent, or Firm* — Schwegman Lundberg & Woessner, P.A.

(57) ABSTRACT

Shortcut keypad system for electronic communications comprises first apparatus and second apparatus. First apparatus and second apparatus each comprise an input device, a processor and a memory. The input device comprises selectable items including first selectable item. The processor of the first apparatus receives a selection of the first selectable item, and transmits a signal corresponding to the first selectable item to the second apparatus. The processor of the second apparatus receives the signal corresponding to the first selectable item, and causes the input device of the second apparatus to indicate that the signal corresponding to the first selectable item is received. Other embodiments are described herein.

20 Claims, 5 Drawing Sheets

Related U.S. Application Data

(60) Provisional application No. 62/954,957, filed on Dec. 30, 2019.

(51) Int. Cl.
*H04M 1/72457* (2021.01)
*H04M 1/72469* (2021.01)
*H04W 4/12* (2009.01)

(56) References Cited

U.S. PATENT DOCUMENTS

| | | | | |
|---|---|---|---|---|
| 2014/0279418 | A1* | 9/2014 | Rubinstein | G06F 15/16 |
| | | | | 715/753 |
| 2014/0365944 | A1* | 12/2014 | Moore | G09B 29/003 |
| | | | | 715/772 |
| 2015/0215728 | A1 | 7/2015 | Wilson et al. | |
| 2018/0335930 | A1 | 11/2018 | Scapel et al. | |

OTHER PUBLICATIONS

"U.S. Appl. No. 17/137,953, Notice of Allowance mailed Jun. 8, 2022", 9 pgs.
"U.S. Appl. No. 17/137,953, Response filed May 2, 2022 to Non Final Office Action mailed Feb. 1, 2022", 10 pgs.
U.S. Appl. No. 17/137,953 U.S. Pat. No. 11,477,318, filed Dec. 30, 2020, Shortcut Keypad for Visual Electronic Communications.

* cited by examiner

SHORTCUT KEYPAD FOR VISUAL ELECTRONIC COMMUNICATIONS

CROSS REFERENCED TO RELATED APPLICATIONS

This application is a continuation of U.S. patent application Ser. No. 17/137,953, filed Dec. 30, 2020, which claims priority to U.S. Provisional Patent Application Ser. No. 62/954,957, filed Dec. 30, 2019, the contents of which are incorporated herein by reference in their entirety.

BACKGROUND

The popularity of electronic messaging, particularly instant messaging, continues to grow. Users increasingly send short communications that are meant to quickly communicate a different array of situations, various emotions, etc. Users send avatars and emojis within electronic messages such as texts and emails which reflects a global demand to communicate more visually.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Within a network of individuals on a messaging system, each user has a preferred individual or groups of individuals with whom the user communicates with the most. Embodiments of the present disclosure improve the functionality of the messaging system by facilitating the sharing of quick visual messages (e.g., activated lights on a keypad) being exchanged between such individuals.

Embodiments of the present disclosure improve the functionality of electronic messaging software and systems by providing a direct communication line between two users via shortcut keypads. Two users via their respective shortcut keypads can directly and privately communicate with each other using selectable items that represent emotions, responses, or functions without having to open or activate their client devices. The users can communicate with one another visually using the shortcut keypads. The shortcut keypads can also provide an extension to the electronic communication session that is displayed on a display device of the client device.

Among other things, embodiments of the present disclosure comprise an apparatus that comprises a housing or an external case that includes shortcut keypad. The shortcut keypad that can be selected by a user of the apparatus or client device to cause the corresponding activated key on the shortcut keypad of a contact of the user of the apparatus to be activated. In one example, the user of the apparatus can set the shortcut keypad to be associated with the one contact of the user of the apparatus. The contact that is associated with the shortcut keypad can be the preferred close contact of the user with whom the user exchanges audio messages or media content items such that he would benefit from this rapid method of communication via the shortcut keypad.

Apparatus with Shortcut Keypad

Figure 1:
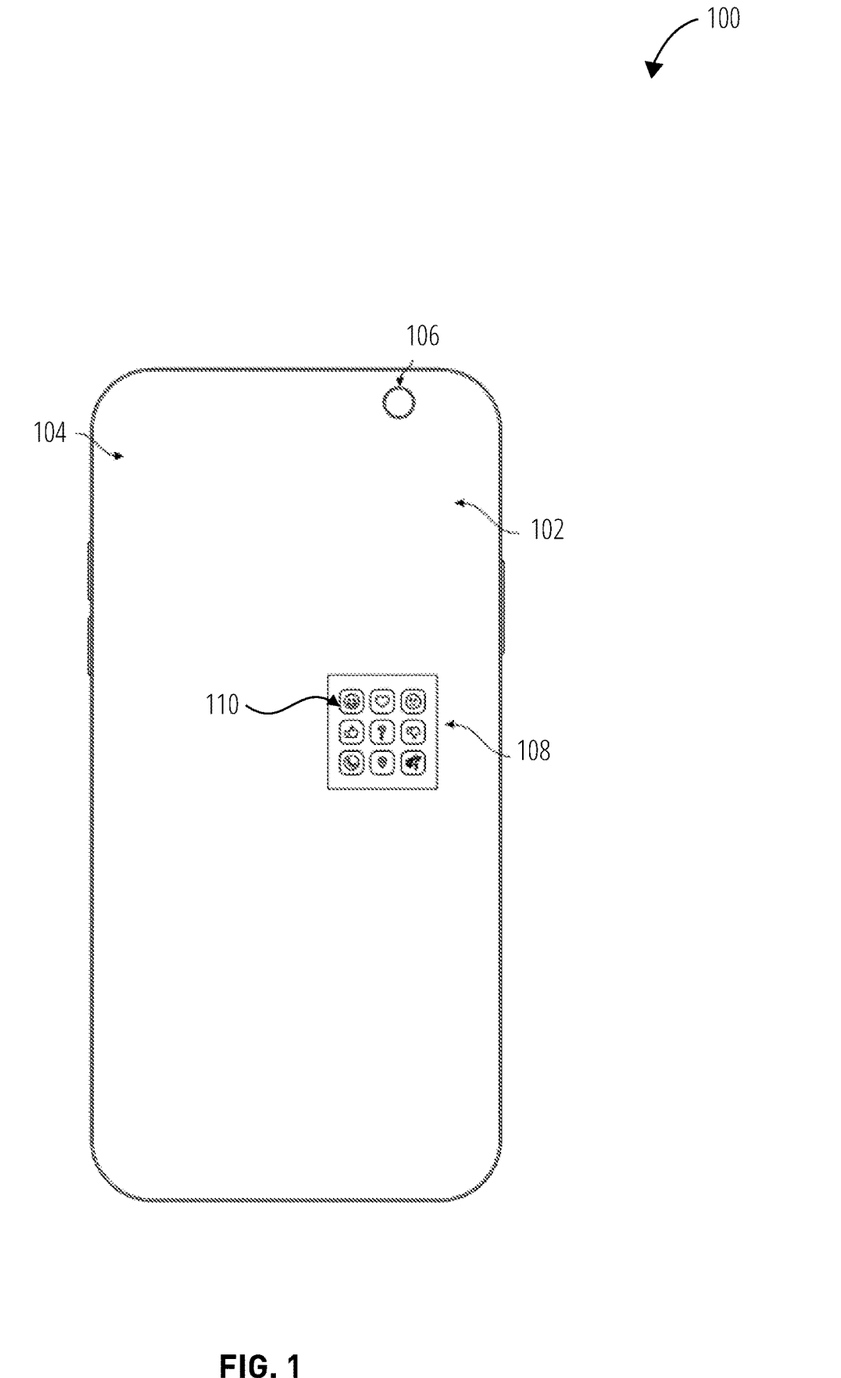
FIG. 1 illustrates a system 100 in which an apparatus 102 with a shortcut keypad 108 can be implemented according to one example embodiment
Figure 4:
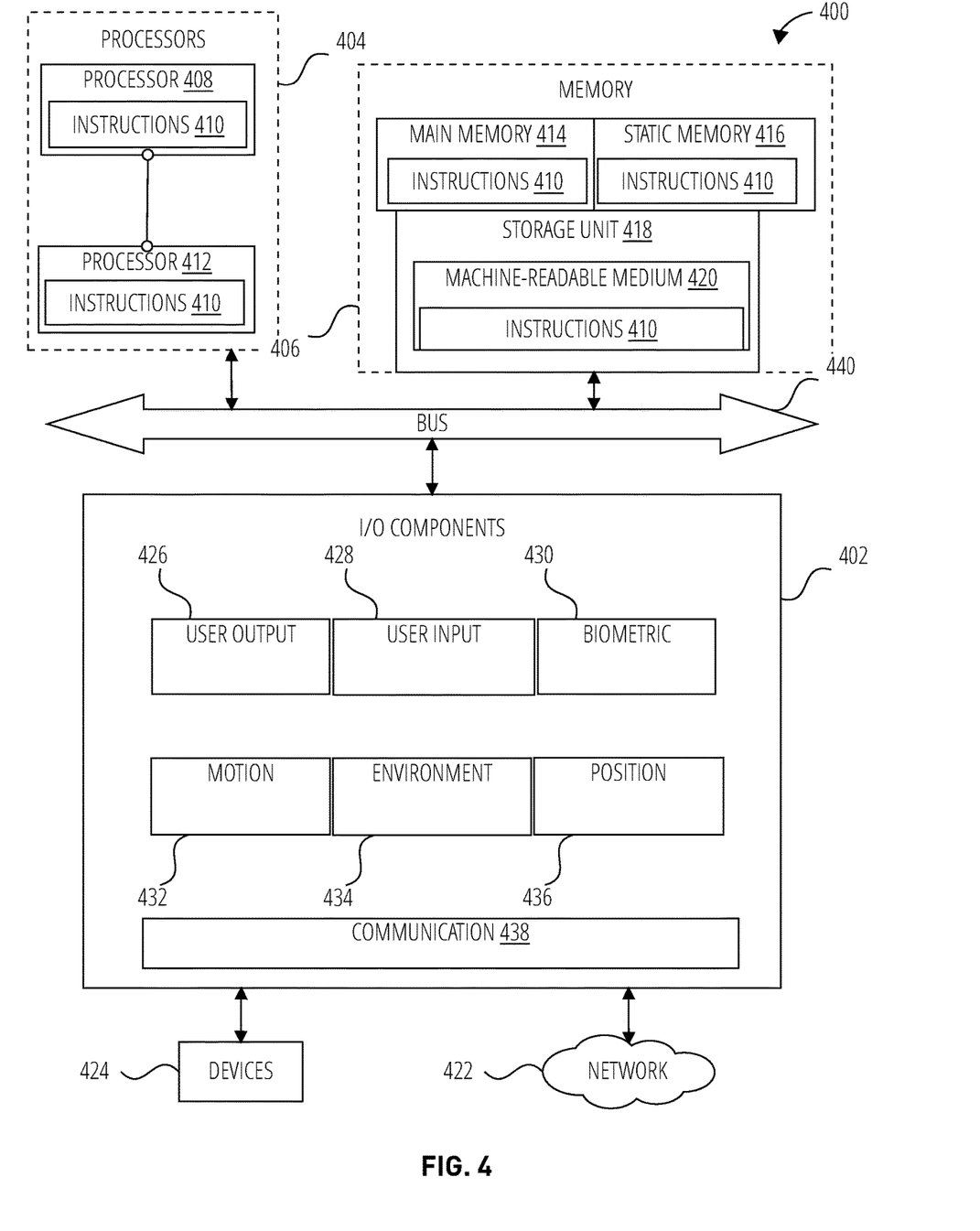
FIG. 4 is a diagrammatic representation of a machine in the form of a computer system within which a set of instructions may be executed for causing the machine to perform any one or more of the methodologies discussed herein, in accordance with some examples.

FIG. 1 illustrates a system 100 in which the apparatus 102 with a shortcut keypad 108 can be implemented according to one example embodiment. While not shown, the system 100 comprises two identical apparatuses apparatus 102 (e.g., one not shown). In some embodiments, each of the apparatuses apparatus 102 can be coupled to a client device (not shown). For example, the client device can be the machine 400 as illustrated in FIG. 4.

The apparatus 102 comprises a housing 104 that can be a case or a device extension which can be coupled to a client device. A housing case can be a protective case for the client device. The device extension can be an external device that can be coupled to the client device, for example, magnetically.

In some embodiments, the apparatus 102 that is a housing case or a device extension includes display device 206 that is separate from a display device included in the client device. In other embodiments, rather than being an external case or housing, the apparatus 102 is incorporated in any client device having a display device. For example, the client device can be the machine 400 as illustrated in FIG. 4.

As shown in FIG. 1, the apparatus 102 comprises a housing 104, a camera opening 106 with a camera lens, and a shortcut keypad 108. While not shown in FIG. 1, the apparatus 102 can also comprise a camera, a camera image sensor, a processor, a communication interface, and a power source (e.g., a battery). In one embodiment, the housing 104 is shaped to be coupled to a client device. In another embodiment, the housing 104 is the housing of the client device having the display device, the camera and the microphone or microphones.

In one embodiment, the camera opening 106 is an opening in the housing 104 that couples to a camera lens of the camera that can be included in the apparatus 102 or in the client device. In one embodiment, the camera opening 106 can be a window allowing the camera lens to capture image or video content (e.g., media content items). The camera that is included in the apparatus 102 or the client device can include the camera lens and an image sensor. The camera lens may be a perspective camera lens or a non-perspective camera lens. A non-perspective camera lens may be, for example, a fisheye lens, a wide-angle lens, an omnidirectional lens, or the like. The image sensor captures images or digital video through the camera lens. The images may be also be a still image frame or a video including a plurality of still image frames.

As shown in FIG. 1, the shortcut keypad 108 can include a plurality of selectable items 110. The selectable items 110 can be arranged in an n by n grid or matrix, where n is an integer greater than 1. The selectable items 110 can also be arranged in an n by m grid or matrix, where n and m are integers greater than 1 and n is different from m. In the embodiment shown in FIG. 1, the selectable items 110 are arranged in a 3 by 3 grid or matrix.

The selectable items 110 can be physical or virtual buttons that are associated with a function, an emotion or a response. In one embodiment, the physical buttons can have relief in order for the user to feel the different buttons. Each of the selectable items 110 comprise an image, an emoji, an emoticon, or a UNICODE character for identification. For example, in FIG. 1, the selectable items 110 can comprise a smiley face emoji, a heart emoji, a sad face emoji, a thumbs up emoji, a question mark character, a thumbs down emoji, an image of a telephone, an image of a map pinpoint, and an image of a person running.

Each of the selectable items 110 can be associated with a function, an emotion or a response. For example, the user can select the smiley face selectable item by pressing or clicking on the virtual or physical button with the smiley face thereon to communicate a feeling such as being happy.

The selectable items 110 can be used to communicate different emotions or responses that can be agreed upon between the users such that their meanings can be customizable. For example, the smiley face selectable item can also be used to communicate a greeting. In some examples, the heart emoji selectable item can be used to communicate like or love feelings; the sad face emoji selectable item can be used to communicate sad or unhappy feelings; a thumbs up emoji selectable item can be used to communicate approval or congratulations; a question mark character selectable item can be used to communicate a question or confusion; a thumbs down emoji selectable item can be used to communicate disapproval; and the selectable item with the image of a person running can be used to communicate that the user is running late.

In some embodiments, the selectable items 110 can be associated with functions. For example, the selectable item with the map pinpoint can be used to send the user's location to the receiving user's client device. In this embodiment, the receiving user's client device is caused display on the display device the sending user's location on a map or the address in text format.

The selectable items 110 can also be used in combination to send different communications or intentions. For example, a combination of selecting the selectable item with the map pinpoint and the question mark character selectable item can communicate: "where are you located?". The user receiving this question can then respond by selecting the selectable item with the map pinpoint to transmit his location.

Similarly, the selectable item with the telephone image used in conjunction with the question mark character selectable item can be used to indicate that a phone call is desired or to ask if a phone call is possible. Selecting the selectable item with the telephone image alone can be associated with the function of causing a client device associated with the apparatus 102 to initiate a telephone call to the other user.

In one embodiment, the shortcut keypad 108 comprises lights coupled to the selectable items. The lights can be initiated or activated for a period of time as feedback to a user that his selection of a selectable item is received. For example, upon receiving a selection from the user of the thumbs up emoji selectable item, the light associated with the thumbs up emoji can be activated to provide feedback to the user. Activated light can shine around the selectable item, in the center of the selectable item, or on the entire selectable item. In some embodiments, each of the selectable items can be associated with a sound or vibration that can also provide the feedback to the user.

In addition to providing feedback to the sending user, the lights can also be activated for a period of time to indicate to the receiving user that the sending user has activated a given selectable item. In this manner, sending and receiving users can communicate via the shortcut keypad. This system 100 comprising two apparatuses (e.g., first apparatus 102 and second apparatus 102) can thus provide visual communication line between two users.

In one embodiment, the processor of the sending user's apparatus 102 receives the selection of the first selectable item (e.g., the smiley face emoji selectable item) and transmits a signal corresponding to the first selectable item to the receiving user's apparatus 102. In this embodiment, the processor of the receiving user's apparatus 102 can receive the signal corresponding to the first selectable item and cause the input device of the receiving user's apparatus 102 to indicate that the signal corresponding to the first selectable item is received. For example, to indicate that the signal corresponding to the first selectable item is received, the processor of the receiving user's apparatus 102 can cause a first light of the plurality of lights that is coupled to the first selectable item (e.g., the smiley face emoji selectable item) to be activated for a period of time.

If the first selectable item selected by the sending user is the selectable item with the map pinpoint, in one embodiment, to indicate that the signal corresponding to the first selectable item is received, the processor of the receiving user's apparatus 102 can cause a display of a client device communicatively coupled to the receiving user's apparatus 102 to display a location of the sending user.

In one embodiment, when the processor of the sending user's apparatus 102 transmits a signal corresponding to the first selectable item to the receiving user's apparatus 102, the processor of the sending user's apparatus 102 can also send a short message service (SMS) or electronic message in an application to indicate that the first selectable item is being transmitted. In this embodiment, the client device associated with the receiving user's apparatus 102 receives and causes the SMS or electronic message to be displayed.

In another embodiment, the processor of the sending user's apparatus 102 can also transmit the signal corresponding to the first selectable item directly to a client device. The client device can be associated with the receiving user's apparatus 102. In this embodiment, the client device causes a message (e.g., SMS or electronic message) or notification associated with the first selectable item to be displayed.

In another embodiment, the client device can receive inputs that are transmitted to the receiving user's apparatus 102 that cause the selectable items to be activated. In this embodiment, client device associated with the sending user can include an input device that includes the shortcut keypad 108 with selectable items 110.

Figure 2:
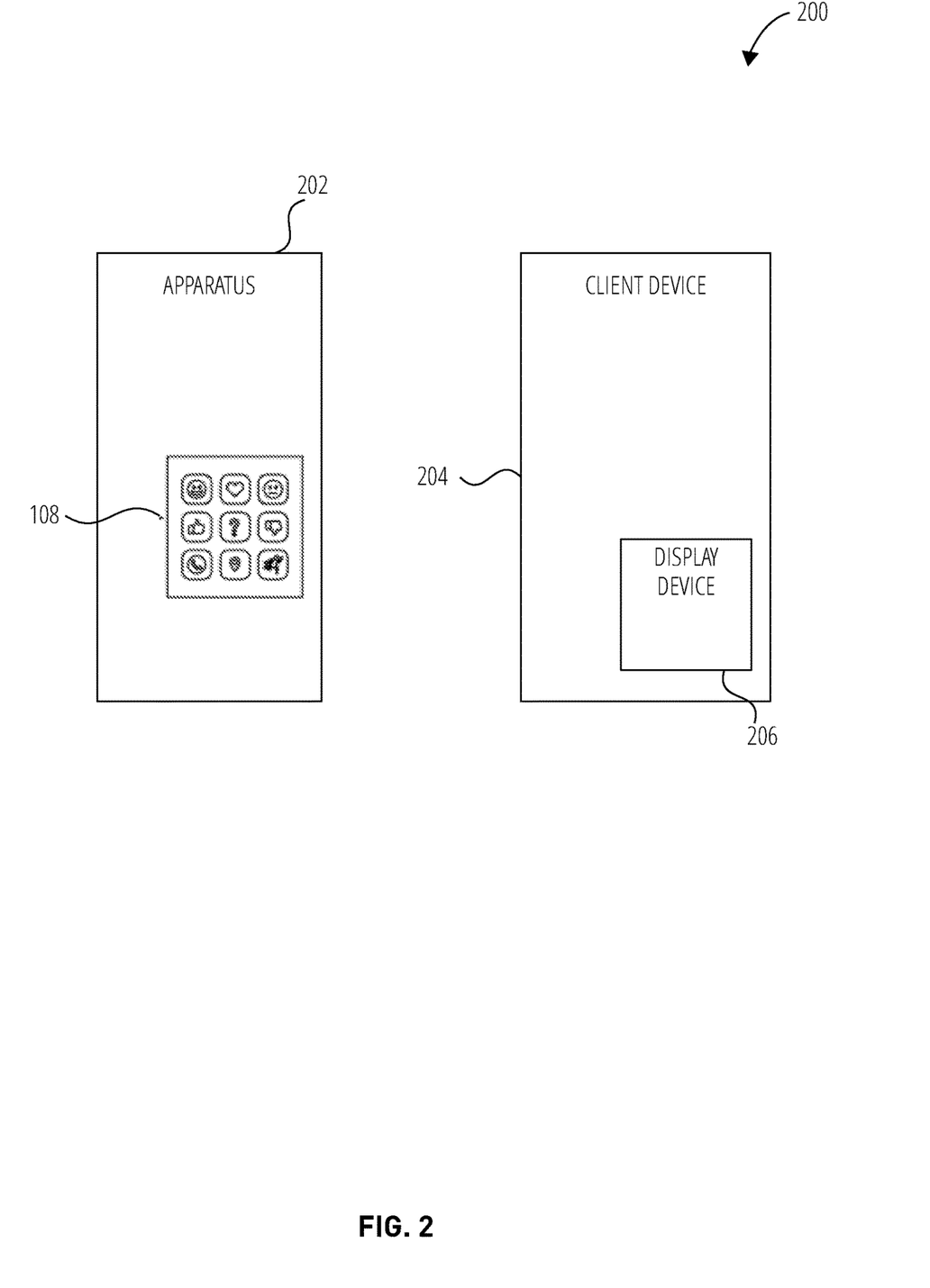
FIG. 2 illustrates a system 200 in which an apparatus 202 with a shortcut keypad 108 can be implemented according to one example embodiment.

FIG. 2 illustrates a system 200 in which the apparatus 202 with the shortcut keypad 108 can be implemented according to one example embodiment. In this embodiment, the system 200 includes an apparatus 202 including the shortcut keypad 108 that is communicatively coupled to the client device 204 that comprises a display device 206. The apparatus 202 (or the shortcut keypad 108) can be communicatively coupled via a wired connection (e.g., USB cables) or a wireless connection (e.g., WiFi, BlueTooth, 5G).

In FIG. 2, the apparatus 202 comprises a processor and a shortcut keypad 108. The shortcut keypad 108 is communicatively coupled to the client device 204. The client device 204 comprises a display device 206 which can also be communicatively coupled to the shortcut keypad 108 or to the processor of the apparatus 202. In this embodiment, in response to receiving a selection of one of the selectable items 110 on the shortcut keypad 108, the apparatus 202 can cause the display device 206 to display an image or text associated with the selectable item of the selectable items 110 that was pressed by the user.

In one embodiment, the client device 204 can be associated with the user of the apparatus 202 with the shortcut keypad 108. A history of the selectable items that were selected and received via the shortcut keypad 108 can be stored on the client device 204. In this manner, the user can activate the client device 204 to view any of the communications via the shortcut keypad 108 that he missed or would like to review. In this embodiment, the display device can be caused to display the history of the selectable items that were selected and the functions that were activated (e.g., the location maps that were received). In one embodiment, the history of the selectable items can also be sent within a short message service (SMS) or electronic messaging application.

In the embodiments described herein, the shortcut keypad 108 provides a more efficient system by decreasing the time and the steps required to communicate with a desired recipient (e.g., the contact of the user of the apparatus 202). For example, in one embodiment, the shortcut keypad 108 allows the user to cause one or more of the selectable items 110 on a receiving apparatus 202 of the desired recipient (e.g., a contact of the user of the sending apparatus 202) by simply activating (e.g., pressing) the one or more selectable items 110. In one example, the desired recipient is selected by the user of the apparatus 202 when setting up the apparatus 202 such that the desired recipient is associated with the shortcut keypad 108 as the recipient of visual communications using the shortcut keypad 108. The shortcut keypad 108 further leverages the fact that most users communicate with a single contact most frequently (e.g., best friend, significant other, etc.).

In one embodiment, instead of the apparatus 202 in system 200, any wearable device can be included in the system 200 and include the shortcut keypad 108 that is communicatively coupled to the client device 204. Some embodiments may include one or more wearable devices, such as a pendant with an integrated camera that is integrated with, in communication with, or coupled to, the client device 204. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, or any other wearable devices.

In another embodiment, the client device 204 can be associated with a receiving user that is preset to be associated with the apparatus 202. In this example, the apparatus 202 with the shortcut keypad 108 can communicate with the receiving user's client device 204. Rather than cause the selectable items 110 on the receiving user's apparatus 202 to be illuminated, the apparatus 202 can cause emojis, images, or text corresponding to the selected one or more of selectable items 110 from the apparatus 202 to be displayed on the display device 206 of the receiving user's client device 204.

In one embodiment, the shortcut keypad 108 can be used as an input device to play games over a network with any user having an apparatus 102 or apparatus 202. For example, the user can activate a game mode and play tic-tac-toe on using the shortcut keypad 108 with any user that is available on the network with an apparatus 102 or apparatus 202. In this embodiment, a first user can select a first selectable item on his shortcut keypad 108 which causes the first selectable item to be activated on his shortcut keypad 108 in a first color, and the first selectable item to be activated on a second user's shortcut keypad 108 in the first light color. The second user can select a second selectable item on her shortcut keypad 108 which causes the second selectable item to be activated on her shortcut keypad 108 in a second color and the second selectable item on the first user's shortcut keypad 108 to be activated in the second color. In this embodiment, each of the selectable items in the shortcut keypad 108 can have at least two colored lights assorted therewith. Using the shortcut keypads 108, the users on a network can play games virtually and anonymously. In this embodiment, the users can be matched as players in a game by a processor running an application on the client devices 204 or by a processor on the apparatuses 102 or 202.

In the embodiments described herein, the shortcut keypad 108 shortens the time or the steps required to communicate in a chat or electronic communication by providing a direct communication line that is private between two users and that does not require activation or unlocking of a client device 204 or typing messages within the chat. Accordingly, the apparatus 202 is an improvement on the current systems because, for example, there is no need for the user to turn on his client device 204 to quickly communicate short messages with another specific user. Further, the shortcut keypad 108 provides a new interface that can increase the user's engagement with the systems.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Visual Communications Using the Shortcut Keypad

Figure 3:
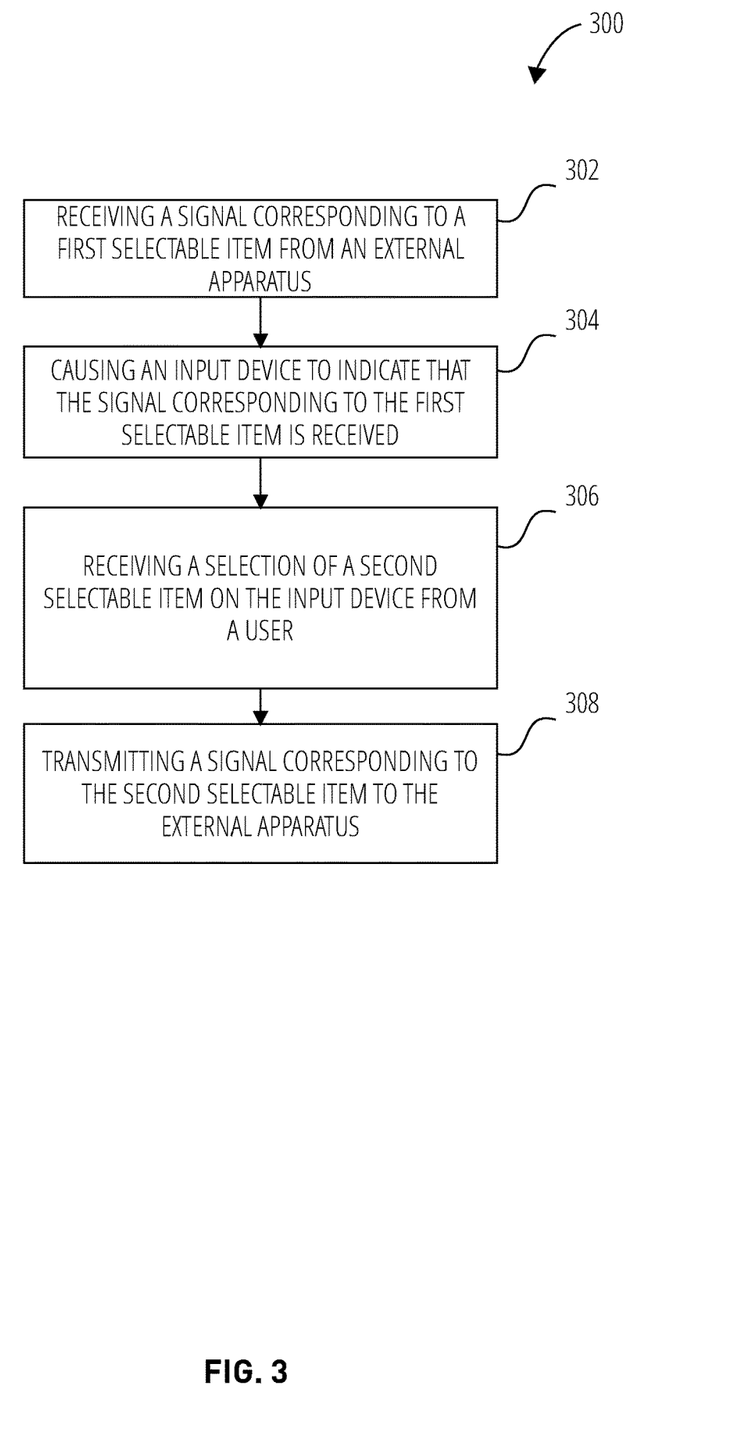
FIG. 3 is a flowchart for a process 300 of visually communicating using the shortcut keypad 108, in accordance with some examples.

FIG. 3 is a flowchart illustrating a process 300 of visually communicating using the shortcut keypad 108 (or input unit), in accordance with some examples.

At operation 302, a processor of a first apparatus 102 or apparatus 202 of a user receiving a signal corresponding to a first selectable item from an external apparatus. The external apparatus can be a second apparatus 102 or apparatus 202 that is associated with a preferred contact of the user. In one example, both the first and the second apparatus 102 or apparatus 202 comprises a shortcut keypad 108 that includes selectable items 110. Each of the shortcut keypads 108 includes the first selectable item. The selectable items 110 comprise a plurality of physical or virtual buttons. Each of the selectable items 110 comprise an image, an emoji, an emoticon, or a UNICODE character. Each of selectable items 110 is associated with a function, an emotion or a response.

The preferred contact of the user can be preset by the user on the first apparatus 102 or apparatus 202. The user can, for example, select any contact, such as the contact that he or she most communicates with. The contact of the user can be one of the user's contacts is associated with identification information stored on the client device 204 associated with the user of the first apparatus 102 or apparatus 202.

At operation 304, the processor of the first apparatus 102 or apparatus 202 causes an input device to indicate that the signal corresponding to the first selectable item is received. In one example, the input device is a shortcut keypad 108. The input device can comprises a grid of the plurality of selectable items and can comprises a plurality of lights coupled to the plurality of selectable items.

At operation 306, the processor of the first apparatus 102 or apparatus 202 receives a selection of a second selectable item on the input device from the user.

At operation 308, the processor of the first apparatus 102 or apparatus 202 transmits a signal corresponding to the second selectable item to the external apparatus.

In one embodiment, the processor of the external apparatus that is a second apparatus 102 or apparatus 202 can cause the input device of the second apparatus 102 or apparatus 202 to indicate that the signal corresponding to the first selectable item is received. For example, the processor of the second apparatus 102 or apparatus 202 can cause a first light of the plurality of lights that is coupled to the first selectable item of the second apparatus 102 or apparatus 202 to be activated for a period of time.

When the first selectable item is associated with a location function, in one example, the processor of the second apparatus 102 or apparatus 202 causes a display of a client device 204 that is communicatively coupled to the second apparatus 102 or apparatus 202 to display a location of a user associated with the first apparatus 102 or apparatus 202.

Machine Architecture

FIG. 4 is a diagrammatic representation of the machine 400 within which instructions 410 (e.g., software, a program, an application, an applet, an app, or other executable code) for causing the machine 400 to perform any one or more of the methodologies discussed herein may be executed. For example, the instructions 410 may cause the machine 400 to execute any one or more of the methods described herein. The instructions 410 transform the general, non-programmed machine 400 into a particular machine 400 programmed to carry out the described and illustrated functions in the manner described. The machine 400 may operate as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein. The machine 400, for example, may comprise the client device 204 or any one of a number of server devices forming part of a messaging server system. In some examples, the machine 400 may also comprise both client and server systems, with certain operations of a particular method or algorithm being performed on the server-side and with certain operations of the particular method or algorithm being performed on the client-side.

The machine 400 may include processors 404, memory 406, and input/output I/O components 402, which may be configured to communicate with each other via a bus 440. In an example, the processors 404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 408 and a processor 412 that execute the instructions 410. The term "processor" is intended to include multi-core processors that may comprise two or more independent processors (sometimes referred to as "cores") that may execute instructions contemporaneously. Although FIG. 4 shows multiple processors 404, the machine 400 may include a single processor with a single-core, a single processor with multiple cores (e.g., a multi-core processor), multiple processors with a single core, multiple processors with multiples cores, or any combination thereof.

The memory 406 includes a main memory 414, a static memory 416, and a storage unit 418, both accessible to the processors 404 via the bus 440. The main memory 406, the static memory 416, and storage unit 418 store the instructions 410 embodying any one or more of the methodologies or functions described herein. The instructions 410 may also reside, completely or partially, within the main memory 414, within the static memory 416, within machine-readable medium 420 within the storage unit 418, within at least one of the processors 404 (e.g., within the Processor's cache memory), or any suitable combination thereof, during execution thereof by the machine 400.

The I/O components 402 may include a wide variety of components to receive input, provide output, produce output, transmit information, exchange information, capture measurements, and so on. The specific I/O components 402 that are included in a particular machine will depend on the type of machine. For example, portable machines such as mobile phones may include a touch input device or other such input mechanisms, while a headless server machine will likely not include such a touch input device. It will be appreciated that the I/O components 402 may include many other components that are not shown in FIG. 4. In various examples, the I/O components 402 may include user output components 426 and user input components 428. The user output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 402 may include biometric components 430, motion components 432, environmental components 434, or position components 436, among a wide array of other components. For example, the biometric components 430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 432 include acceleration sensor components (e.g., accelerometer), gravitation sensor components, rotation sensor components (e.g., gyroscope).

The environmental components 434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 204 may have a camera system comprising, for example, front cameras on a front surface of the client device 204 and rear cameras on a rear surface of the client device 204. The front cameras may, for example, be used to capture still images and video of a user of the client device 204 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 204 may also include a 360° camera for capturing 360° photographs and videos.

Further, the camera system of a client device 204 may include dual rear cameras (e.g., a primary camera as well as a depth-sensing camera), or even triple, quad or penta rear camera configurations on the front and rear sides of the client device 204. These multiple cameras systems may include a wide camera, an ultra-wide camera, a telephoto camera, a macro camera and a depth sensor, for example.

The position components 436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 402 further include communication components 438 operable to couple the machine 400 to a network 422 or devices 424 via respective coupling or connections. For example, the communication components 438 may include a network interface Component or another suitable device to interface with the network 422. In further examples, the communication components 438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 424 may be another machine or any of a wide variety of peripheral devices (e.g., a peripheral device coupled via a USB).

Moreover, the communication components 438 may detect identifiers or include components operable to detect identifiers. For example, the communication components 438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 438, such as location via Internet Protocol (IP) geolocation, location via Wi-Fi® signal triangulation, location via detecting an NFC beacon signal that may indicate a particular location, and so forth.

The various memories (e.g., main memory 414, static memory 416, and memory of the processors 404) and storage unit 418 may store one or more sets of instructions and data structures (e.g., software) embodying or used by any one or more of the methodologies or functions described herein. These instructions (e.g., the instructions 410), when executed by processors 404, cause various operations to implement the disclosed examples.

The instructions 410 may be transmitted or received over the network 422, using a transmission medium, via a network interface device (e.g., a network interface component included in the communication components 438) and using any one of several well-known transfer protocols (e.g., hypertext transfer protocol (HTTP)). Similarly, the instructions 410 may be transmitted or received using a transmission medium via a coupling (e.g., a peer-to-peer coupling) to the devices 424.

Software Architecture

Figure 5:
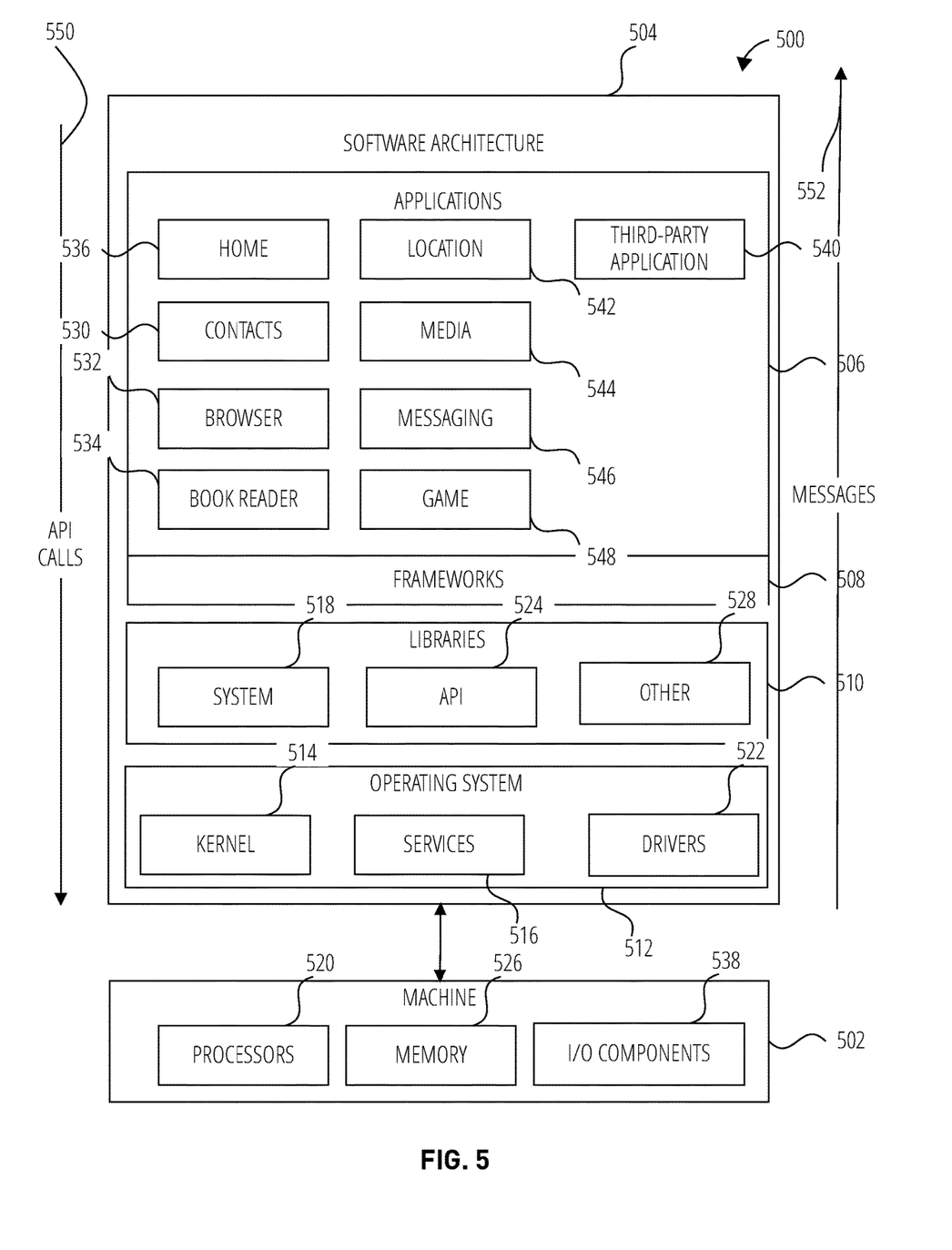
FIG. 5 is a block diagram showing a software architecture within which examples may be implemented.

FIG. 5 is a block diagram 500 illustrating a software architecture 504, which can be installed on any one or more of the devices described herein. The software architecture 504 is supported by hardware such as a machine 502 that includes processors 520, memory 526, and I/O components 538. In this example, the software architecture 504 can be conceptualized as a stack of layers, where each layer provides a particular functionality. The software architecture 504 includes layers such as an operating system 512, libraries 510, frameworks 508, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionality. The services 516 can provide other common services for the other software layers. The drivers 522 are responsible for controlling or interfacing with the underlying hardware. For instance, the drivers 522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 510 provide a common low-level infrastructure used by the applications 506. The libraries 510 can include system libraries 518 (e.g., C standard library) that provide functions such as memory allocation functions, string manipulation functions, mathematic functions, and the like. In addition, the libraries 510 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 510 can also include a wide variety of other libraries 528 to provide many other APIs to the applications 506.

The frameworks 508 provide a common high-level infrastructure that is used by the applications 506. For example, the frameworks 508 provide various graphical user interface (GUI) functions, high-level resource management, and high-level location services. The frameworks 508 can provide a broad spectrum of other APIs that can be used by the applications 506, some of which may be specific to a particular operating system or platform.

In an example, the applications 506 may include a home application 536, a contacts application 530, a browser application 532, a book reader application 534, a location application 542, a media application 544, a messaging application 546, a game application 548, and a broad assortment of other applications such as a third-party application 540. The applications 506 are programs that execute functions defined in the programs. Various programming languages can be employed to create one or more of the applications 506, structured in a variety of manners, such as object-oriented programming languages (e.g., Objective-C, Java, or C++) or procedural programming languages (e.g., C or assembly language). In a specific example, the third-party application 540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 540 can invoke the API calls 550 provided by the operating system 512 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium"

and "signal medium" mean the same thing and may be used interchangeably in this disclosure.

What is claimed is:

1. An apparatus comprising:
an input device comprising a plurality of selectable items including a first selectable item;
a processor; and
a memory having instructions stored thereon, when executed by the processor, causes the processor to perform operations comprising;
receiving a selection of the first selectable item, and
transmitting a signal corresponding to the first selectable item to an external apparatus, wherein the apparatus is coupled to a first client device associated with a first user and the external apparatus is coupled to a second client device associated with a second user, wherein the apparatus and the external apparatus are a housing case or a device extension.

2. The apparatus of claim 1, wherein the plurality of selectable items comprise a plurality of physical or virtual buttons.

3. The apparatus of claim 1, wherein each of the plurality of selectable items comprise an image, an emoji, an emoticon, or a UNICODE character.

4. The apparatus of claim 1, wherein each of the plurality of selectable items is associated with a function, an emotion or a response.

5. The apparatus of claim 1, wherein the input device comprises a grid of the plurality of selectable items.

6. The apparatus of claim 1, wherein the input device comprises a plurality of lights coupled to the plurality of selectable items.

7. The apparatus of claim 6, wherein the signal corresponding to the first selectable item causes an input device of the external apparatus to indicate that the signal corresponding to the first selectable item is received.

8. The apparatus of claim 7, wherein the signal corresponding to the first selectable item causes a first light of the plurality of lights that is coupled to the first selectable item to be activated for a period of time.

9. The apparatus of claim 7, wherein the first selectable item is associated with a location function.

10. The apparatus of claim 9, wherein the signal corresponding to the first selectable item causes a display of the second client device coupled to the external apparatus to display a location of the first user.

11. The apparatus of claim 1, wherein each of the apparatus and the external apparatus comprises a communication interface.

12. An apparatus comprising:
an input device comprising a plurality of selectable items including a first selectable item;
a processor; and
a memory having instructions stored thereon, when executed by the processor, causes the processor to perform operations comprising:
receiving a signal corresponding to the first selectable item from an external apparatus, and
causing the input device to indicate that the signal corresponding to the first selectable item is received, wherein the apparatus is coupled to a first client device associated with a first user and the external apparatus is coupled to a second client device associated with a second user, wherein the apparatus and the external apparatus are a housing case or a device extension.

13. The apparatus of claim 12, wherein the plurality of selectable items comprise a plurality of physical or virtual buttons.

14. The apparatus of claim 12, wherein each of the plurality of selectable items is associated with a function, an emotion or a response.

15. The apparatus of claim 12, wherein the input device comprises a grid of the plurality of selectable items.

16. The apparatus of claim 12, wherein the input device comprises a plurality of lights coupled to the plurality of selectable items.

17. The apparatus of claim 16, wherein the processor performing operations further comprises:
causing a first light of the plurality of lights that is coupled to the first selectable item to be activated for a period of time.

18. The apparatus of claim 12, wherein the first selectable item is associated with a location function.

19. The apparatus of claim 12, wherein the processor performs operations further comprising:
causing a display of the second client device coupled to the external apparatus to display a location of the first user.

20. A method comprising:
receiving by a first apparatus a signal corresponding to a first selectable item from a second apparatus, wherein the first apparatus is coupled to a first client device associated with a first user and the second apparatus is coupled to a second client device associated with a second user, wherein the first apparatus and the second apparatus are a housing case or a device extension; and
causing an input device included in the first apparatus to indicate that the signal corresponding to the first selectable item is received, wherein the input device includes a plurality of selectable items including the first selectable item.

* * * * *